Jan. 13, 1959   J. M. ROBERTSON   2,868,216
METHOD AND APPARATUS FOR DETERMINING, AND
FOR MAINTAINING CONSTANT, THE PROPORTIONS
OF A FLOWING FLUID MIXTURE
Filed March 16, 1953
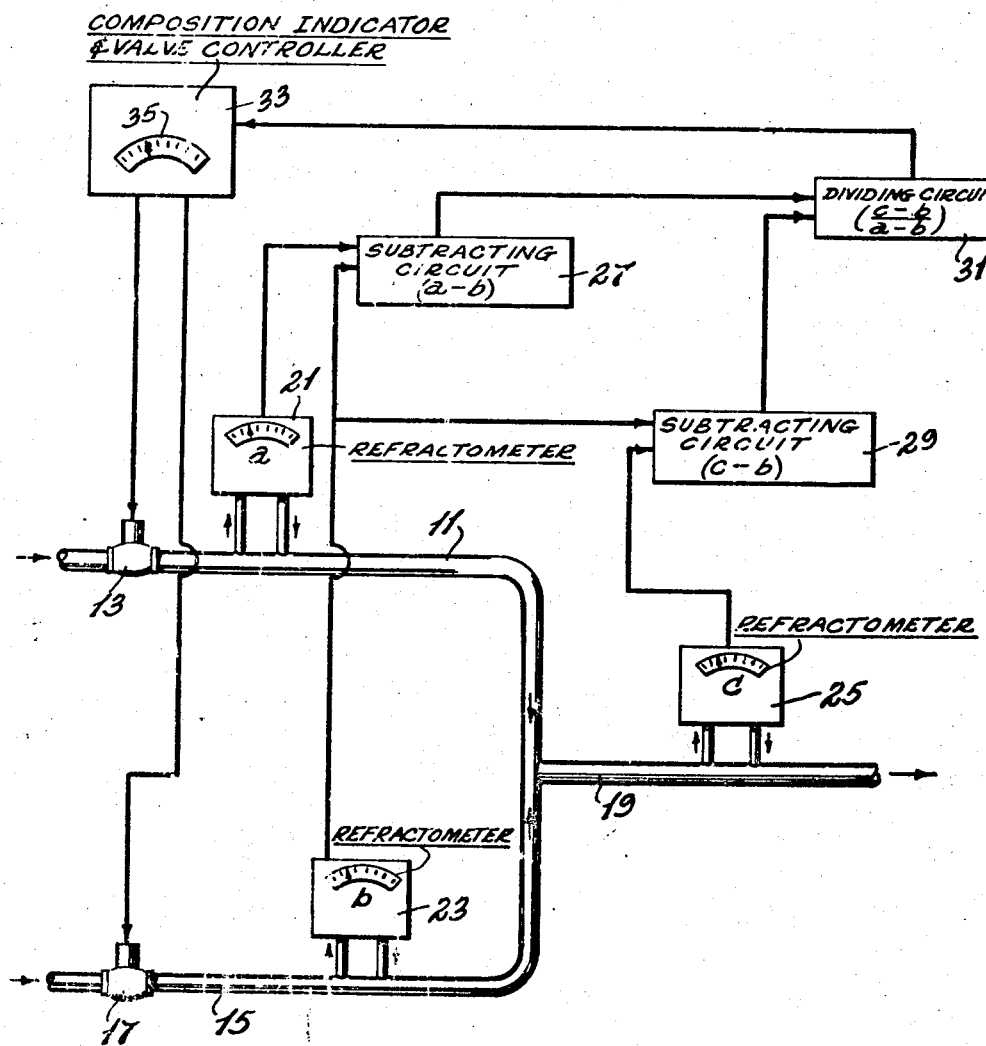

United States Patent Office 2,868,216
Patented Jan. 13, 1959

2,868,216

METHOD AND APPARATUS FOR DETERMINING, AND FOR MAINTAINING CONSTANT, THE PROPORTIONS OF A FLOWING FLUID MIXTURE

James M. Robertson, Kingsville, Tex., assignor to The Texas Company, New York, N. Y., a corporation of Delaware Application March 16, 1953, Serial No. 342,509

12 Claims. (Cl. 137—9)

This invention relates to a novel method of and apparatus for determining, and for automatically maintaining constant, the proportions of a flowing fluid mixture which is separately supplied with flowing streams of two different fluids.

In many operations two different fluids are directed into a single conduit to produce a flowing mixture wherein the proportions of the two mixed fluids should be kept substantially constant even when the feeds may vary slightly in volume and in fluid characteristics. For example, even though the volume rate of feed may be constant, one or both of the feed fluids may vary slightly in certain physical or chemical characteristics such as viscosity, refractive index, electrical conductivity, hydrogen ion concentration, and others. Such variations may falsely indicate in the mixture that the proportions have changed. When such changes in characteristics are coupled with changes in rate of flow, the situation is further complicated.

As a concrete example of the problem outlined above, in solvent dewaxing one of the feed liquids is a petroleum fraction and the other a solvent such as acetone or methyl ethyl ketone mixed with toluol. If the refractive index of the petroleum feed changes from time to time, even though the flow rate is unchanged, corresponding changes in the refractive index of the flowing stream of mixture also occur. Other changes in the refractive index of the mixture will occur if there are also variations in flow rates and variations in the refractive index of the solvent. Consequently, continuous recording refractometers and automatic proportioning controls which are based solely upon changes in the refractive index of the flowing mixture, as in U. S. Patent 2,569,127, cannot be relied upon to provide an accurate record or accurate control of proportions.

In accordance with the present invention the disadvantages mentioned above are eliminated by automatically and continuously sensing a characteristic common to the flowing mixture and the separate streams of feed fluids before they unite to form the mixture. Then the value of the characteristic of the mixture, as determined by a suitable instrument, is automatically modified by electronic or mechanical computers to provide a measure of the true proportions in the mixture even though one or both of the feed fluids may be varying in characteristic and in flow rate.

For example, when using the index of refraction as the characteristic sensed, the proportions of first and second feed fluids in the mixture are computed by continuously automatically subtracting the index of refraction of the second fluid from the index of the first fluid thereby obtaining a first difference, continuously automatically subtracting the index of the second fluid from the index of the mixture thereby obtaining a second difference, and continuously electronically dividing the second difference by the first difference to obtain the desired proportion as a quotient. When one of the feed fluids is known to have an unchanging index, of course, the electronic computer may have the correct value incorporated therein and it becomes unnecessary to sense the index of that liquid continuously.

A suitable conventional recording device can be operated by the computing circuits for automatically keeping a continuous record of the composition of the mixture. Also, one or more suitable control valves in the feed fluid conduit may be operated by the electronic computing circuits to vary the flow of feed liquids as necessary to maintain the desired composition and flow rate of the mixture.

In the drawing the single figure represents, schematically, a suitable arrangement of apparatus for successfully performing the method described above.

A first fluid, such as a liquid solvent, is supplied through a conduit 11 controlled by an automatic valve 13, while the second fluid, for example petroleum liquid to be dewaxed, is supplied through a second conduit 15 controlled by an automatic valve 17. The two fluids from conduits 11 and 15 merge and flow together as a mixture through a third conduit 19.

Three continuous indicating or recording refractometers 21, 23, and 25 are connected into the three conduits 11, 15, and 19, respectively. The two refractometers 21 and 23 are electrically connected into a conventional electronic subtracting circuit 27 which subtracts the index of refraction $b$ of the second fluid from the index $a$ of the first fluid to give a first difference. The refractometer 23 also is connected into a second subtracting circuit 29 which is electrically connected with the mixture refractometer 25 and acts to subtract the index of refraction $b$ of the second fluid from the index of refraction $c$ of the mixture as sensed by the refractometer 25 to give a second difference.

The first and second differences are then fed to a conventional electronic dividing circuit 31 wherein the second difference $c-b$ is divided by the first difference $a-b$ to develop an electrical signal having a characteristic representing the true measure of the proportions in the mixture flowing through conduit 19. This signal is then electrically transmitted to a combined composition indicator and valve controller 33 of conventional construction which continuously indicates the proportions in the mixture on a scale 35, and which is electrically connected to the control valves 13 and 17 for regulating the flow of the fluids through conduits 11 and 15 as is required to maintain constant the proportions of the mixture flowing through conduit 19. When a constant flow rate must be maintained in conduit 19, the further opening of one of the valves 13 and 17 is accompanied by a corresponding partial closing of the other. However, when a constant flow rate is unimportant, the proportion can be controlled accurately by varying the position of only one of the valves while the other is unchanged. It is apparent that the composition indicator can be operated without the valve controller, and vice versa.

Any suitable conventional electronic circuits for subtracting and dividing can be employed as the circuits 27, 29, and 31, as will be readily apparent to those skilled in the standard techniques of analogue computing. For example, a suitable subtracting circuit can be one which comprises two series-connected resistors to each of which the individual voltage output of a respective one of the sources 21 and 23 is fed in appropriate polarity for the two of them to be in series opposition, the output of the subtracting circuit being taken from across both of the resistors. Reference is made to an article by David Fidelman entitled "Electronic Analogue Computers" in the Radio Electronic Engineering Edition of Radio and Television News, published by Ziff Davis, which contains a disclosure of fundamental principles in the issues of December 1948 and April, 1949, and in particular shows a dividing circuit.

While the invention has been described in detail as based upon the sensing of refractive index, it should be readily apparent to those skilled in the art that other characteristics of fluids may be employed effectively. For example, changes in viscosity of the two feed fluids and the mixture may be readily sensed by a continuous viscosimeter of the type described in U. S. Patent No. 2,459,483 to Zimmer et al. wherein viscosity is measured in terms of the pressure required to force a liquid through a capillary tube or a flow retarding orifice or Venturi. Instrumentation based on standard blending characterization factors of liquid petroleum fractions, sometimes known as "H-values" to those skilled in the art, can then be employed for the control, through an appropriate analogue computer. An example is ASTM Tentative Viscosity-Temperature Chart for Liquid Petroleum Products (D#341–37T).

Other characteristics which may be sensed continuously and employed to practice the present invention are electrical conductivity and hydrogen ion concentration. In fact any fluid characteristic that can be portrayed by equations or graphs can be transformed to give the desired indication and control of proportions by one skilled in the art by using suitable cams and electronic circuits.

Obviously, many modifications and variations of the invention as hereinbefore set forth may be made without departing from the spirit and scope thereof and, therefore, only such limitations should be imposed as are indicated in the appended claims.

I claim:

1. A method of continuously determining the proportion of a first liquid in a flowing mixture of first and second liquids supplied to said mixture in separate streams, said first liquid and said mixture varying in their refractive indices, said method comprising automatically and continuously measuring the indices of refraction of said first liquid and said mixture; continuously automatically subtracting the index of said second liquid from the index of said first liquid thereby obtaining a first difference; continuously automatically subtracting the index of said second liquid from the index of said mixture and obtaining a second difference; and continuously electronically dividing said second difference by said first difference thereby obtaining said proportion as a quotient.

2. A method which comprises continuously determining the proportion of a first liquid in a flowing mixture of first and second liquids having different indices of refraction by automatically and continuously measuring the indices of refraction of said mixture and of separate streams of said first and second liquids feeding said mixture; continuously electronically subtracting the index of said second liquid from the index of said first liquid thereby obtaining a first difference; continuously electronically subtracting the index of said second liquid from the index of said mixture and obtaining a second difference; and continuously electronically dividing said second difference by said first difference thereby obtaining said proportion as a quotient.

3. Apparatus for determining the proportion of a first fluid in a flowing mixture of first and second fluids having a common measurable characteristic, said fluids differing in the magnitude of said characteristic, comprising a conduit for said mixture; first and second pipes for said first and second fluids communicating with said conduit first, second, and third; measuring means operatively associated with said conduit and with said first and second pipes, respectively, for continuously and automatically measuring said common characteristic of said mixture and said first and second fluids; and electronic computing means cooperating concurrently with all of said first, second, and third means for computing said proportion from the measurements so made.

4. Apparatus in accordance with claim 3, also comprising recording means cooperating with said electronic means for recording said proportion.

5. Apparatus in accordance with claim 3, also comprising mechanism for regulating the flow through said first and second pipes, said mechanism being operatively connected with said electronic means for regulating such flow automatically in accordance with changes in said characteristic, to maintain said proportion substantially constant in said mixture.

6. Apparatus in accordance with claim 3 wherein said characteristic is refractive index, and said measuring means comprises first, second, and third automatic continuous refractometers severally connected into said first and second pipes and said conduit.

7. Apparatus in accordance with claim 6, wherein said electronic computing means comprises a first subtracting circuit coupled to said first and second refractometers and operating to subtract the refractive index of said second fluid from that of said first fluid to provide a first difference; a second subtracting circuit coupled to said second and third refractometers and operating to subtract the refractive index of said second fluid from that of said mixture to provide a second difference; and a dividing circuit coupled to said first and second subtracting circuits and operating to divide said second difference by said first difference to give said proportion.

8. A method of continuously determining the proportion of a first fluid in a flowing mixture of first and second fluids supplied to said mixture in separate streams, said first and second fluids having a common measurable characteristic, said first fluid and said mixture both varying in said measurable characteristic, said method comprising automatically and continuously measuring said characteristic of both said first fluid and said mixture; continuously automatically subtracting the value of said characteristic of said second fluid from the value of said characteristic of said first fluid thereby obtaining a first difference; continuously automatically subtracting the value of said characteristic of said second fluid from the value of said characteristic of said mixture and obtaining a second difference; and continuously automatically dividing said second difference by said first difference thereby obtaining said proportion as a quotient.

9. A method in accordance with claim 8 for continuously determining said proportion when said second fluid also varies in said measurable characteristic, also comprising automatically and continuously measuring said characteristic of said second fluid concurrently with said first fluid and said mixture.

10. A method in accordance with claim 9, wherein said fluids are liquids, and said measured characteristic is the index of refraction of each of said first and second fluids and of said mixture.

11. Apparatus for determining the proportion of a first fluid in a flowing mixture of first and second fluids, at least said first fluid and said mixture varying in refractive index; said apparatus comprising a conduit for said mixture; first and second pipes for said first and second fluids, respectively, communicating with said conduit; automatic continuous refractometers operatively associated with said conduit and at least with said first pipe for continuously and automatically measuring the refractive index of said mixture and at least said first fluid; and computing means cooperating concurrently with all of said refractometers and operable automatically for computing said proportion from the measurements so made.

12. A method in accordance with claim 9, also comprising maintaining said proportion substantially constant by automatically regulating the flow of said first and second fluids in response to variations in said measurable characteristic.

(References on following page)

References Cited in the file of this patent

UNITED STATES PATENTS

| | | |
|---|---|---|
| 1,399,200 | Edelman | Dec. 6, 1921 |
| 1,471,342 | Logan | Oct. 23, 1923 |
| 2,063,140 | Allison | Dec. 8, 1936 |
| 2,427,996 | Seaman | Sept. 23, 1947 |
| 2,513,562 | Holuba | July 4, 1950 |
| 2,526,515 | Stein | Oct. 17, 1950 |
| 2,529,030 | Latchum | Nov. 7, 1950 |
| 2,569,127 | Eltenton | Sept. 25, 1951 |
| 2,649,014 | Johnsen | Aug. 18, 1953 |
| 2,774,732 | Blight | Dec. 18, 1956 |